Figure 1:
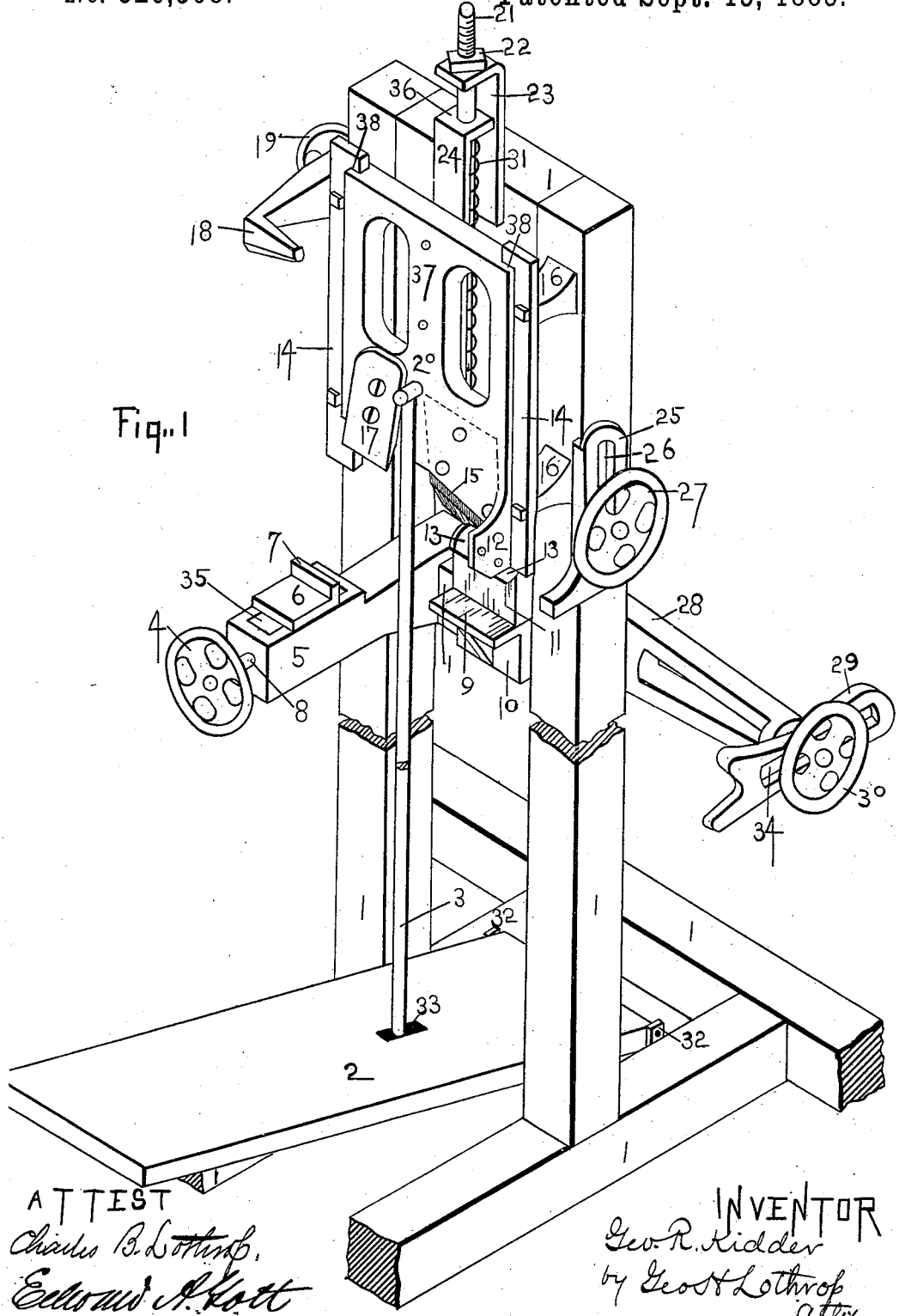

(No Model.) 2 Sheets—Sheet 1.

G. R. KIDDER.
SPOKE TENONING MACHINE.

No. 326,508. Patented Sept. 15, 1885.

ATTEST
Charles B. Lothrop
Edward A. Kott

INVENTOR
Geo. R. Kidder
by Geo H Lothrop
Atty

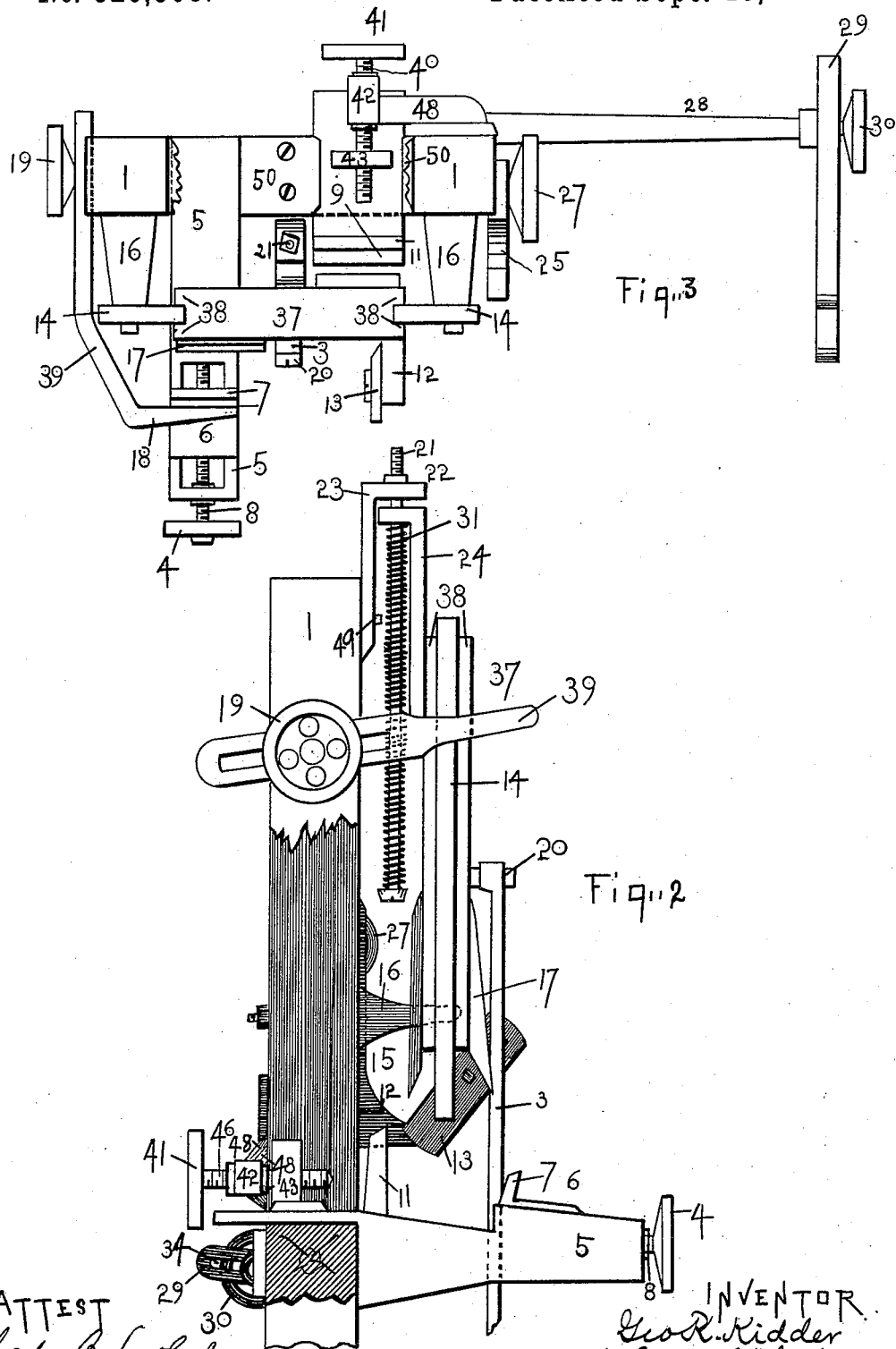

UNITED STATES PATENT OFFICE.

GEORGE R. KIDDER, OF IMLAY CITY, MICHIGAN, ASSIGNOR OF TWO-THIRDS TO JAMES S. FERGUSON AND WILLIAM W. BLACK, OF SAME PLACE.

SPOKE-TENONING MACHINE.

SPECIFICATION forming part of Letters Patent No. 326,508, dated September 15, 1885.

Application filed June 6, 1885. (No model.)

*To all whom it may concern:*

Be it known that I, GEORGE R. KIDDER, of Imlay City, in the county of Lapeer and State of Michigan, have invented a new and useful Improvement in Spoke-Tenoning Machines, of which the following is a specification.

My invention consists in an improvement in machines for tenoning spokes, and is fully pointed out in the claims.

Figure 1 is a perspective. Fig. 2 is a side elevation of the upper end of the machine with part of the frame broken away. Fig. 3 is a plan view.

In shops where wheels are put together by hand it is customary to buy spokes turned to shape and with a rough tenon formed on the end, and these tenons are smoothed and brought to the proper size by means of a chisel or plane, and one side of the end of the spoke is beveled to give the wheel a proper dish.

The object of my invention is to provide a simple and accurate machine for smoothing and sizing the rough tenons and for beveling the ends of spokes, so that a workman can rapidly and accurately tenon and bevel a number of spokes exactly alike.

1 represents the frame of the machine, consisting of a base, two uprights, and two cross-heads between the uprights, all firmly bolted together. It may be made of wood or iron.

2 represents a treadle pivoted at 32 to the base of the frame, and 3 represents a pitman pivoted to the treadle, and bolted at its upper end to a vertically-reciprocating gate, 37, having in its edges grooves 38, which embrace guides 14, secured to brackets 16, firmly bolted to the frame.

9 represents a rest secured on the top of the lower cross-head by a flange, 10, which is bolted to the front of the cross-head, so that rest 9 extends forward in front of the frame, as shown in Fig. 1.

11 represents a gage, which slides on rest 9 and is operated by a screw, 40, which revolves but is stationary in a sleeve, 42, carried on a bracket, 48, secured to the frame, and works in a threaded nut, 43 secured to gage 11, so that turning screw 40 by means of the hand-wheel 41 moves gage 11 on rest 9.

50 represents two guides secured to the top of the cross-head which carries rest 9, and projecting over the edges of gage 11, to hold it to its seat.

28 represents an arm secured to the frame and projecting therefrom.

29 represents an adjustable support having a forked end, and having therein a slot, 34, through which passes a screw-bolt operated by a hand-wheel, 30, which screw works in a threaded hole in the end of arm 28, and by means of which the support 29 can be held in any desired position.

5 represents an arm secured to the same cross-head which carries rest 9, and projects out in front of the machine. The outer end of arm 5 is raised, and the whole arm inclines downward from the cross-head, as clearly shown in Fig. 2. The end of arm 5 is slotted, as shown at 35, and through this slot passes a screw, 8, operated by a hand-wheel, 4, which can turn in said arm, but cannot move endwise.

6 represents a gage with a beveled flange, 7, at its inner end, and has on its lower surface a lug, which reaches down into slot 35, and is screw-threaded to engage with screw 8, so that turning said screw moves the gage.

To the side of the frame, near its top, is an adjustable arm, 39, secured to and adjustable on the frame just as the support 29 is secured to and adjustable on arm 28, 19 being the hand-wheel for clamping arm 39. The end of said arm 39 turns inward and projects over arm 5, as shown in Figs. 1 and 3.

Gate 37 carries three knives, one of which (represented by 15) is directly over rest 9, having its flat side toward said rest, and another of which, 17, is directly over arm 5, and has its flat side toward the outer end of said arm. Each of these knives is set at an angle with the gate, as clearly shown in Fig. 2, and it works better when set in this way, though it may be set parallel. The third knife (represented by 13) is bolted to a projection, 12, on the front side of the gate, so that its edge stands at right angles to the edge of knife 15, and is under one side of the edge of said knife. The edge of knife 15 is tapered, and the edge of knife 13 is rounded, as shown in Fig. 1.

24 represents an arm fastened to gate 37, and rising above the same having its upper end turned away from said gate and provided with a hole, 36.

23 represents a similar arm secured to and rising above the upper cross-head, and through the holes in the upper ends of these two arms passes a bolt, 21, having a head at its lower end and a screw-thread cut on its upper end.

31 represents a spiral spring surrounding bolt 21, one end bearing against the head of said bolt, and the other end bearing against the under side of the upper end of arm 24.

22 represents a nut which screws on the end of bolt 21, and bears against the upper surface of the upper end of arm 23, so that the action of said spring 31 tends to raise arm 24, and with it gate 37.

49 represents a stop on the inner surface of arm 23, to check the downward motion of arm 24, and thus prevent the knives carried by gate 37 from coming in contact with rest 9 or arm 5.

25 represents a slotted gage which has a flange fitting around one corner of one of the uprights of the frame, and a screw passing through slot 26 in said gage into the frame, and operated by a hand-wheel, 27, affords means of securing said gage at any desired height.

The operation of my invention is as follows: The workman adjusts gage 11 to the exact distance from the line of travel of knife 15 that the tenon desired is to be, and then adjusts support 29 so that it will hold the end of the spoke at the right height to cause the tenon to lie square on rest 9. He may then, if he wishes, drop gage 25 until it rests on the upper side of the spoke and secure it in place, when support 29, gage 25, and rest 9 hold it firmly in place; but this gage need not be used unless so desired. The spoke being placed on rest 9 with one side of the rough tenon resting against the face of the gage 11, treadle 2 is depressed, and this draws down gate 37, when knife 13 cuts the shoulder of the tenon to the proper depth, and knife 15 sizes and smooths the tenon. On releasing the treadle spring 31 raises the gate to its normal position. To bevel the end of the spoke, it is placed on the raised part of arm 5, resting against the face of the beveled flange 7, which is adjusted the required distance from the line of travel of the knife 17 by the screw 8. The upper portion of the spoke is rested against the part 18 of the arm 39, which is first adjusted so that when the end of the spoke rests on arm 5 and its upper portion is pressed against the inner surface of 18 the spoke will stand at the desired inclination from a vertical line. By depressing the treadle again knife 17 cuts the end of the spoke to the desired bevel. It is evident that having once set the two gages 11 and 6 7 properly a workman can rapidly size and smooth the tenons of a number of spokes and make them all alike, and can also bevel each spoke alike. The stop 49 prevents injury to the knives, as it stops the downward motion of the gate before knife 17 can come in contact with arm 5, and knives 13 and 15 clear rest 9 as they descend.

I prefer to slot knife 13 in the ordinary manner of a plane chisel, and have the bolts which hold it to projection 12 pass through the slot, and this may be done or not with the other knives. This is simply a well-known manner of providing for setting the knives forward to compensate for wear.

What I claim as my invention, and desire to secure by Letters Patent, is—

1. In a spoke-tenoning machine, the combination, with the frame, of a vertically-moving gate running on guides, a treadle connected with the gate to depress it, and a spring connected with it to raise it, two inclined knives secured to the lower portion of said gate adjacent to and at right angles to each other, one adapted to cut a shoulder and the other to size a tenon, a rest in the line of travel of said knives to support one end of a spoke and provided with an adjustable guide, and a support to one side of said rest to sustain the other end of said spoke, substantially as shown and described.

2. In a spoke-tenoning machine, the combination, with a vertically-moving gate and means for operating the same, of an arm projecting in front of said gate to support one end of a spoke, an adjustable arm above said first arm to support the other end of the spoke at the desired angle, and an inclined knife secured to the said gate to cut a bevel on the lower end of the spoke in the descent of the gate, substantially as described.

3. In a spoke-tenoning machine, the combination, with the vertically-moving gate 37, carrying at its lower portion the knife 17, and the described means of operating said gate, of the arm 5, projecting in front of said gate and carrying the adjustable gage 6 7, and the adjustable arm 39 18, secured to the machine-frame and extending forward of said gate and over said arm 5, substantially as and for the purposes described.

4. The combination, with the vertically-moving gate 37, carrying at its lower portion knife 17, and also knives 13 and 15, adjacent and at right angles to each other, of the treadle 2, pitman 3, connecting said treadle and gate, bent arm 24, extending from the upper end of said gate, bent arm 23, secured to the frame of the machine and projecting upward therefrom, headed bolt 21, passing through said arms 24 and 23 and provided with nut 22 above arm 23, and the spiral spring 31, bearing against the head of said bolt and the bent end of arm 24, substantially as and for the purposes described.

5. In a spoke-tenoning machine, the combination, with knives for cutting a tenon, of a rest, 9, for one end of a spoke, an arm, 28, projecting from the side of the machine and carrying an adjustable support, 29, for sustaining one end of the spoke opposite to rest 9, and an adjustable gage, 25, secured to the side of the machine and adapted to bear on the spoke to hold it in place, substantially as described.

6. In a spoke-tenoning machine, the combination, with the frame of the machine, of the vertically-moving gate 37, having grooves 38 in its edges, guides 14, secured to brackets 16, bolted to the frame and fitting in grooves 38, treadle 2, pivoted at 32 to the base of the frame, pitman 3, pivoted to the treadle and secured to the gate, knife 13, bolted to the projection 12 of the gate and projecting toward the frame, knife 15, bolted to the gate and with its lower end projecting from the gate toward the frame of the machine, and rest 9, adapted to support the end of a spoke in the line of travel of knives 13 and 15, substantially as shown and described.

GEORGE R. KIDDER.

Witnesses:
CYRUS E. LOTHROP,
GEO. H. LOTHROP.